United States Patent Office 3,679,567
Patented July 25, 1972

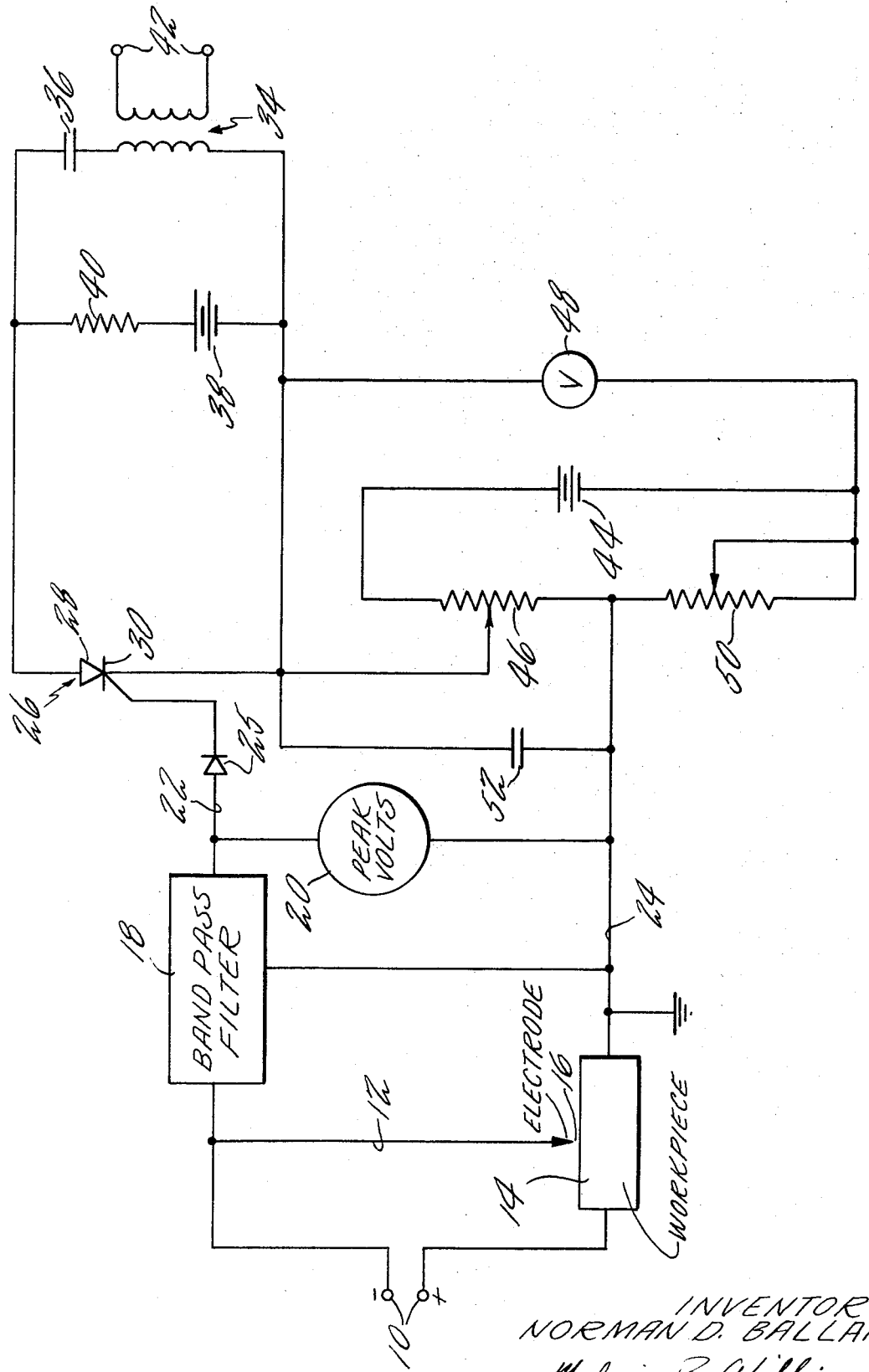

3,679,567
ELECTROCHEMICAL SPARK DETECTION SYSTEM
Norman D. Ballard, East Hartford, Conn., assignor to United Aircraft Corporation, East Hartford, Conn.
Filed Mar. 19, 1971, Ser. No. 125,968
Int. Cl. B01k 3/00; B23p 1/02
U.S. Cl. 204—228    3 Claims

ABSTRACT OF THE DISCLOSURE

A spark detection system for an electrochemical machining apparatus has an adjustable threshold for electrical disturbances typically caused by sparking in the gap between the electrode and the workpiece. The threshold level is directly readable in volts.

BACKGROUND OF THE INVENTION

Field of invention

This invention relates to electrochemical machining apparatus, and more particularly to circuitry to detect an electrical disturbance in excess of a preset limit, typically caused by a spark.

Description of the prior art

In the operation of electrochemical machining apparatus, the machining process is basically one of electrolysis wherein a DC potential is applied between an electrode and a workpiece, the workpiece being connected to the positive terminal of the DC potential and the electrode (or cathode) being connected to the negative terminal. A conductive solution or electrolyte, usually comprised of an aqueous solution of a soluble metallic salt, is introduced between the electrode and the workpiece usually by pumping it through a hole in the electrode. During the electrolysis, the material on the workpiece, opposite the electrode, goes into the solution and is flushed away. As this electrochemical erosion takes place, the position of electrode or the workpiece is adjusted so that the gap between the electrode and the workpiece remains constant.

Electrochemical machining is used to make precision holes or irregular cavities in aircraft engine components or in other applications to tolerances on the order of .001". Current levels between the workpiece and electrode are less than 100 amperes DC for machines used in these applications.

For fast and accurate machining, it is desirable to have minimum gap length and maximum electrolyzing current, but excessive electrolyzing current at a small gap length may cause a short circuit or a spark. Other causes of short circuits or sparks may be from poor distribution in the flow of electrolyte in the gap between the electrode and the workpiece, an insufficient injection pressure of the electrolyte, or the presence of impurities in the electrolyte. Persistence of this sparking can damage the cathode thereby requiring its replacement, or damage the workpiece by pitting or by causing stresses that could contribute to its fatigue failure.

One of the characteristics indigenous to the event of a spark occurring between an electrode and a workpiece, is a rapid drop in the electrolyzing voltage and most known spark detection system for electrochemical machining apparatus are responsive specifically to this phenomenon. In a typical prior art implementation of a spark detection system, the input of a band pass filter which will pass electrical spark disturbanes in the spectrum of 10 kilohertz to 100 kilohertz, is connected to a sensitivity adjustment potentiometer which is used as a variable attenuator of the working potential between the electrode and the workpiece. The output of the band pass filter is connected to an amplifier which drives a relay. The filter is necessary because a high level of electrical noise is inherent in the basic electrochemical process, which could cause relay actuation in the absence of filtering. When there is a spark disturbance within the band pass of the filter sufficient to cause actuation of the relay, the electrochemical machining process is usually terminated by the action of the relay.

The disadvantage of a typical prior art spark detection system is that it is difficult to provide filtering and high system sensitivity so that there is adequate discrimination between a spark and a permissible disturbance inherent to the process, because indications of the electrochemical machining voltage disturbances occurring between the electrode and the workpiece are not provided on a continuous basis and there is an absence of continuous indication of the minimum disturbance level which will cause actuation of the relay. Because of this disadvantage, it is not possible, using the teachings of the prior art, to transfer spark detecting senstivity settings uniformly to a plurality of apparatus for electrochemical machining.

Another disadvantage of existing spark detection systems is that there is a likelihood of the sensitivity being adjusted to a too high level, with a resulting high frequency of process terminations due to the spark detection equipment causing considerable time to be lost in the piece part production.

SUMMARY OF THE INVENTION

An object of the present invention is to provide an electrochemical machining apparatus spark detection system which is simpler and more reliable than heretofore available in the prior art.

A further object of the present invention is to provide a novel electrochemical machining spark detection system wherein a signal is generated when an electrical disturbance beyond a preset limit occurs in the gap between the electrode and the workpiece.

Another object of the present invention is to provide an electrochemical machining apparatus spark detection system wherein there is a continuous indication of the minimum level of electrical disturbance between the electrode and the workpiece which will cause the spark detection system to respond with an output that may be used to terminate the electrochemical machining process.

According to the present invention, a spark detection system for electrochemical machining apparatus is comprised of monostable circuit means with its input connected to the output of a band pass filter driven by the potential across the gap between the electrode and the workpiece, with the trigger level of said monostable circuit means adjusted to the minimum intolerable gap disturbance level, and voltage measuring means for indicating the voltage required to trigger said monostable circuit means.

In further accord with the invention, a peak reading voltmeter which substantially retains a reading for several seconds, connected across the output of the band pass filter, provides a continual indication of the actual level of gap disturbance.

The present invention not only provides a circuit that will detect electrical disturbances in the gap between the workpiece and the electrode above a preset limit but provides a continual direct reading in volts of the preset limit. The invention thereby provides means for continually comparing the preset limit with the actual level of gap disturbance. Furthermore, since the sensitivity of the spark detection system is continually measured, the sensitivity setting of one spark detector system is readily transferable to a plurality of other spark detector systems on other electrochemical machines.

BRIEF DESCRIPTION OF THE DRAWING

The sole figure herein is a schematic diagram of a preferred embodiment of the present invention.

DESCRIPTION OF THE PREFERRED EMBODIMENT

Referring now to the drawing, a DC working potential for the electrolyzing process is provided by the electrochemical machining apparatus at input terminals 10, to an electrode 12 and a workpiece 14. The spark detector system, described hereinafter, provides means for signaling control circuitry in the electrochemical machining apparatus so that when a spark occurs in a gap 16 between the electrode 12 and the workpiece 14, the electrolyzing process may be terminated by the automatic removal of the voltage at the input terminals 10.

A band pass filter 18 has its input terminals connected across the gap 16 for the purpose of filtering out the minor gap disturbances associated with the electrochemical machining process. In this embodiment, the band pass filter 18 also performs the essential function of blocking the DC portion of the working potential across the gap 16 so that only changes in voltages (caused by a spark or other disturbance) appear at its output. A peak reading voltmeter 20, such as one comprised of a pulse stretching network driving a DC voltmeter gives a constant indication in volts of disturbances that occur in the gap 16, which have been passed by the band pass filter 18. A spark causes a rapid decrease of potential in the gap 16 and the electrode 12 becomes more positive with respect to the workpiece 14. Since the band pass filter 18 contemplated in this embodiment substantially passes the leading edge of potential changes in the gap 16, a spark causes the voltage to increase rapidly at an output terminal 22 with respect to a common terminal 24, which is coupled through a diode 25 to a thyristor 26. In the operation of the thyristor 26, an anode to cathode voltage in excess of about one volt is a necessary condition for heavy conduction from its anode 28 to its cathode 30 immediately upon the application of a potential of about one volt from a gate 32 to the cathode 30. The conduction current is usually heavy and limited by associated circuitry. The application of the positive potential between the gate 32 and the cathode 30 which initiates conduction of the thyristor 26, is referred to in this embodiment as triggering of the thyristor 26. In almost all thyristor circuits, upon triggering, the thyristor anode to cathode voltage is made to drop rapidly to about 0.6 volt by associated circuitry to prevent excessive power dissipation or burn out. After triggering, conduction is substantially independent of an input to the gate 32 in a manner similar to the loss of grid control in a thyratron tube after it is triggered. Conduction and nonconduction of the thyristor 26 characterizes the two states of this bistable device. In order to terminate conduction of the thyristor 26, it is necessary to reduce the source of anode to cathode current below a minimum sustaining current required for conduction. Upon conduction of the thyristor 26, the inductance of the primary winding of a pulse transformer 34 in series with a capacitor 36 form a series resonant circuit. Initially, the capacitor 36 is charged to the voltage of an anode voltage source 38, and it is the discharge time of the capacitor 36, determined by the value of the primary inductance of the pulse transformer 34 and the value of the capacitor 36, which determines when the minimum sustaining current for conduction of the thyristor 26 is no longer available. Therefore, the conduction of the thyristor 26 does not represent a stable state of the circuit because a fixed time after the thyristor 26 starts to conduct, it will return to a stable state of nonconduction. Since the circuit has one stable state, it is referred to as monostable. When the thyristor 26 ceases to conduct, the circuit is heavily damped by a resistor 40 through which the capacitor 36 is charged to substantially the voltage of the anode voltage source 38. The charging time is directly related to the size of the capacitor 36 and the resistor 40. After the capacitor 36 is charged, the thyristor 26 can be made to respond to another input pulse in a manner hereinbefore described. Discharging the capacitor 36 through the thyristor 26 causes the discharge current to be conducted through the primary winding of the pulse transformer 34 coupling a pulse to output terminals 42, where the pulse may be utilized to operate a latching relay or other device to remove the working potential from the input terminals 10.

In this embodiment, the adjustment of the input sensitivity of the spark detection system to a minimum intolerable disturbance level is provided by varying the trigger sensitivity of the thyristor circuit by applying a selectable DC bias voltage between the cathode 30 and the gate 32, such that a voltage equal to the sum of the bias voltage and the intrinsic trigger level of the thyristor 26 is the circuit triggering level. A portion of he voltage provided by a DC bias voltage source 44 is used for biasing the cathode 30 to the gate 32 so that an input signal at the terminals 22, 24 equal to the minimum intolerable disturbance level is required for triggering. Since in the absence of an output from the band pass filter 18, the terminals 22, 24 are at the same potential, the bias voltage from the terminal 22 to the cathode 30 is the potential that appears from the cathode 30 to the common terminal 24 and is varied by moving the wiper arm of a sensitivity potentiometer 46. A DC voltmeter 48 is connected to read the bias voltage added to the voltage drop across a calibration potentiometer 50. A reading of the thyristor circuit trigger level by the DC voltmeter 48 requires that the voltmeter 48 read the bias voltage added to the intrinsic potential required for triggering the thyristor 26 and for this reason, the calibration potentiometer 50 is adjusted so that the voltage drop across it is equal to the intrinsic potential required for triggering. After this adjustment, the sensitivity potentiometer 46 may be adjusted to a desired circuit triggering level, read directly on the DC voltmeter 48. Because of the necessity of causing the diode 25 to conduct in order to impress a potential from the output terminal 22 on the gate 32, the conduction characteristics of the diode 25 must be considered in combination with the approximately one volt gate to cathode voltage requirement for the conduction of the thyristor 26. Therefore, the calibration potentiometer 50 should be adjusted so that a voltage drop of about 1.6 volts is across it. The 0.6 volt normally required for the forward conduction drop of a silicon diode is added to the one volt intrinsic gate to cathode voltage requirement for triggering the thyristor 26 and the total of 1.6 volts comprises the triggering level of the monostable circuit.

A sudden turn on of working potential at the input terminals 10 causes a transient condition wherein the output terminal 22 is negative with respect to the common terminal 24. Application of this voltage directly across the gate 32 and the cathode 30 would cause the thyristor 26 to break down. A breakdown would also be caused by attempting to apply a fixed bias voltage (as hereinbefore described for adjustment of the triggering level of the thyristor 26) polarized opposite the polarity for triggering the thyristor 26, if it is in excess of the reverse gate to cathode thyristor voltage rating. In order to prevent possible breadown from the gate 32 to the cathode 30, the diode 25, having a relatively high peak inverse voltage rating and low reverse leakage current (compared to the gate to cathode thyristor junction), is inserted in series with the gate 32 and poled so that it prevents the flow of current from the cathode 30 to gate 32 whenever the anode of the diode 25 is negative with respect to the cathode 30 of the thyristor 26.

Electrochemical machining apparatus is commonly used in industrial environments where line voltage changes and electromagnetic and electrostatic disturbances may produce undesired potentials in the spark detection equipment. It is necessary, in this embodiment, for the thyristor 26 to be triggered by changes in the potential of the output terminal 22 with respect to the common terminal 24. It is also necessary in industrial environments to suppress any spurious triggering that might be initiated by a change common to both terminals 22, 24 induced by equipment environmental conditions. This is accomplished by a by-pass capacitor 52 which couples any changes in the potential at the common terminal 24 to the cathode 30 of the thryistor 26. Therefore, if the terminals 22, 24 experience the same transient signal, the thyristor 26 will not be triggered because the change in potential will be common to both the gate 32 and the cathode 30.

Although the invention has been shown and described with respect to a preferred embodiment thereof, it should be understood by those skilled in the art that various changes and omissions in the form and detail thereof may be made therein without departing from the spirit and the scope of the invention.

Having thus described a typical embodiment of my invention, that which I claim as new and desire to secure by Letters Patent of the United States is:

1. A spark detection system for an electrochemical machining apparatus of the type in which a working potential is applied across a gap formed between an electrode and a workpiece, comprising:

band pass filter means having an output and having an input adapted for connection across the gap, said band pass filter means having a pass band selected to pass changes of potential due to sparking and filter out normal disturbances associated with the electrochemical process;

circuit means capable of operating in either one of two states, said circuit means normally operating in a first one of said states, said circuit means operable in response to an input signal of a given magnitude applied thereto to change from operation in said first state to operation in the second one of said states, said circuit means including means for adjusting said given magnitude of input signal, thereby to adjust the input sensitivity of said circuit means, the input to said circuit means being connected to the output of said band pass filter means;

means for measuring the selected magnitude of input signal required to cause said circuit means to change into said second state; and means responsive to said circuit means for detecting the change of said circuit means from operation in its first state to operation in its second state.

2. The spark detection system according to claim 1 wherein:

said circuit means includes an electronic switch having an intrinsic operating voltage;

said means for adjusting the input sensitivity of said circuit means comprises an adjustable source of bias voltage, said electronic switch connected in series with said source of bias voltage across the input of said circuit means; and said means for measuring the input sensitivity of said circuit means comprises an additional source of voltage equal to the intrinsic operating voltage required to operate said electronic switch and a DC voltmeter for reading the combined voltage of said adjustable bias source and said additional voltage source, whereby said DC voltmeter directly reads the total voltage required to cause said circuit means to change from its first state to its second state.

3. The spark detection system according to claim 2 additionally comprising a peak reading voltmeter connected across the output of said band pass filter means, thereby providing an indication of gap disturbances and enabling a continuous comparison of readings of said DC voltmeter to said peak reading voltmeter so that the input sensitivity of said monostable circuit means can be adjusted while observing the level of gap disturbance.

References Cited

UNITED STATES PATENTS

| 3,433,728 | 3/1969 | Petroff | 204—228 X |
| 3,520,791 | 7/1970 | Pfau et al. | 204—228 X |
| 3,524,804 | 8/1970 | Götz et al. | 204—228 X |
| 3,533,927 | 10/1970 | Manning | 204—143 M |
| 3,548,257 | 12/1970 | Drushel et al. | 204—143 M |

JOHN H. MACK, Primary Examiner

D. R. VALENTINE, Assistant Examiner

U.S. Cl. X.R.

204—143 M